(12) United States Patent
Haag et al.

(10) Patent No.: US 12,034,590 B2
(45) Date of Patent: Jul. 9, 2024

(54) SIMPLIFIED OPERATION AND ARCHITECTURE OF A CENTRAL OFFICE POINT OF DELIVERY WITHIN A BROADBAND ACCESS NETWORK OF A TELECOMMUNICATIONS NETWORK

(71) Applicant: Deutsche Telekom AG, Bonn (DE)

(72) Inventors: Thomas Haag, Rodgau (DE);
Hans-Joerg Kolbe, Darmstadt (DE);
Fabian Schneider, Darmstadt (DE);
Sabine Szuppa, Storkow (DE)

(73) Assignee: DEUTSCHE TELEKOM AG, Bonn (DE)

( * ) Notice: Subject to any disclaimer, the term of this patent is extended or adjusted under 35 U.S.C. 154(b) by 175 days.

(21) Appl. No.: 17/298,627

(22) PCT Filed: Dec. 2, 2019

(86) PCT No.: PCT/EP2019/083365
§ 371 (c)(1),
(2) Date: May 31, 2021

(87) PCT Pub. No.: WO2020/114986
PCT Pub. Date: Jun. 11, 2020

(65) Prior Publication Data
US 2022/0052911 A1    Feb. 17, 2022

(30) Foreign Application Priority Data
Dec. 3, 2018    (EP) ..................... 18209907

(51) Int. Cl.
*H04L 41/0803* (2022.01)
*H04L 12/44* (2006.01)
*H04L 12/46* (2006.01)

(52) U.S. Cl.
CPC .......... *H04L 41/0803* (2013.01); *H04L 12/44* (2013.01); *H04L 12/4633* (2013.01)

(58) Field of Classification Search
CPC .. H04L 41/0803; H04L 12/44; H04L 12/4633
See application file for complete search history.

(56) References Cited

U.S. PATENT DOCUMENTS

| 10,623,322 B1* | 4/2020 | Nallamothu | ............ H04L 45/64 |
| 2006/0184645 A1* | 8/2006 | Monette | ................. H04L 12/18 |
| | | | 709/218 |

(Continued)

FOREIGN PATENT DOCUMENTS

| EP | 2536068 A1 | 12/2012 |
| EP | 3300299 A1 | 3/2018 |
| WO | 2018192884 A1 | 10/2018 |

*Primary Examiner* — Dhairya A Patel
*Assistant Examiner* — Sujana Khakural
(74) *Attorney, Agent, or Firm* — LEYDIG, VOIT & MAYER, LTD.

(57) ABSTRACT

A method for operation of a central office point of delivery within a broadband access network of a telecommunications network and/or for flexibly providing, within the central office point of delivery, user-related traffic to at least one central functional entity providing at least one specific functionality within the central office point of delivery or for the central office point of delivery includes: in a first step, the user-related traffic is routed to a specific service edge node, wherein the specific service edge node is selected or determined, by at least one repository node, based on the at least one specific network termination node and/or the specific line termination node; and in a second step, the user-related traffic is provided to the at least one central functional entity.

7 Claims, 2 Drawing Sheets

(56) References Cited

U.S. PATENT DOCUMENTS

| | | | |
|---|---|---|---|
| 2007/0189166 A1* | 8/2007 | Johnson | H04L 41/0803 370/230 |
| 2010/0208621 A1* | 8/2010 | Morper | H04L 43/0811 370/255 |
| 2015/0055623 A1* | 2/2015 | Li | H04W 40/04 370/329 |
| 2016/0301718 A1 | 10/2016 | Imbimbo et al. | |
| 2017/0279712 A1* | 9/2017 | Nainar | H04L 45/64 |
| 2018/0077024 A1* | 3/2018 | Zhang | H04L 41/12 |
| 2019/0149896 A1* | 5/2019 | Grammel | H04J 14/0269 398/3 |

* cited by examiner

SIMPLIFIED OPERATION AND ARCHITECTURE OF A CENTRAL OFFICE POINT OF DELIVERY WITHIN A BROADBAND ACCESS NETWORK OF A TELECOMMUNICATIONS NETWORK

CROSS-REFERENCE TO RELATED APPLICATIONS

This application is a U.S. National Phase Application under 35 U.S.C. § 371 of International Application No. PCT/EP2019/083365, filed on Dec. 2, 2019, and claims benefit to European Patent Application No. EP 18209907.7, filed on Dec. 3, 2018. The International Application was published in English on Jun. 11, 2020 as WO 2020/114986 A1 under PCT Article 21(2).

FIELD

The present invention relates a method for an improved and simplified operation and architecture of a central office point of delivery within a broadband access network of a telecommunications network and/or for flexibly providing, within the central office point of delivery, user-related traffic to at least one central functional entity providing at least one specific functionality, wherein the central office point of delivery and/or the broadband access network comprises a control node or a control plane, at least one repository node and a plurality of line termination nodes.

Furthermore, the present invention relates to a telecommunications network for an improved and simplified operation and architecture of a central office point of delivery within a broadband access network of a telecommunications network and/or for flexibly providing, within the central office point of delivery, user-related traffic to at least one central functional entity providing at least one specific functionality.

Additionally, the present invention relates to a system for an improved and simplified operation and architecture of a central office point of delivery within a broadband access network of a telecommunications network and/or for flexibly providing, within the central office point of delivery, user-related traffic to at least one central functional entity providing at least one specific functionality.

Furthermore, the present invention relates to a program comprising a computer readable program code, and to a computer-readable medium for an improved and simplified operation and architecture of a central office point of delivery within a broadband access network of a telecommunications network and/or for flexibly providing, within the central office point of delivery, user-related traffic to at least one central functional entity providing at least one specific functionality.

BACKGROUND

The exchange of packetized information in broadband communication systems or telecommunications networks, both in fixed-line as in wireless communication systems (or fixed-line communication networks and mobile communication networks) has already grown dramatically and probably will also grow in the future due to the rapid spread of different data services in such communication networks.

The present invention generally relates to the area of aggregation networks linking remote or central access nodes to a backbone network or core network of the telecommunications network, e.g. broadband access network platforms such as 5G or CORD (Central Office Re-architected as a Data Center).

Typically in such architectures, multiple network termination ports are aggregated by an access node (e.g. a DSLAM device (Digital Subscriber Line Access Multiplexer) or an OLT (Optical Line Terminal) device) and interconnected to a subscriber termination device via a layer-2 infrastructure such as a datacenter fabric.

Conventionally, a user or subscriber of the telecommunications network typically needs to be connected to a service edge node (or service edge) such that connectivity can be provided to such user or subscriber. Conventionally, a service edge node typically implements or comprises all the required service edge tasks for a particular type of subscriber (or user) of the telecommunications network or of the central office point of delivery. This provides the possibility to handle all required services, within the service edge node, for a certain group of users or subscribers for which the considered service edge node is responsible.

However, this also means that, regarding specific functionalities within the central office point of delivery—such as wholesale implementations, legal interception, accounting, etc.—, such functionalities are typically implemented in each and every service edge node (and used or invoked for or regarding the users or subscribers handled by that service edge node). This results in a comparatively complex structure (and resulting in a comparatively complex implementation) of such a service edge nodes, as well as in a comparatively high number of backbone routes towards the backbone of the telecommunications network.

SUMMARY

In an exemplary embodiment, the present invention provides a method for operation of a central office point of delivery within a broadband access network of a telecommunications network and/or for flexibly providing, within the central office point of delivery, user-related traffic to at least one central functional entity providing at least one specific functionality within the central office point of delivery or for the central office point of delivery. The central office point of delivery and/or the broadband access network comprises a control node or a control plane, at least one repository node and a plurality of line termination nodes. A specific line termination node of the plurality of line termination nodes is connected—via an access node port of the specific line termination node—to at least one specific network termination node of a plurality of network termination nodes. The broadband access network or the central office point of delivery comprises a plurality of service edge nodes and the at least one central functional entity. User-related traffic—related to the specific line termination node and to a specific service edge node of the plurality of service edge nodes—is routed, within or traversing the central office point of delivery, to the at least one central functional entity. The method comprises: in a first step, the user-related traffic is routed to the specific service edge node, wherein the specific service edge node is selected or determined, by the at least one repository node, based on the at least one specific network termination node and/or the specific line termination node; and in a second step, the user-related traffic is provided to the at least one central functional entity. The at least one central functional entity corresponds to a network node providing the at least one specific functionality. The network node: provides accounting information; processes accounting information; provides performance monitoring; and/or provides a legal interception functionality.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
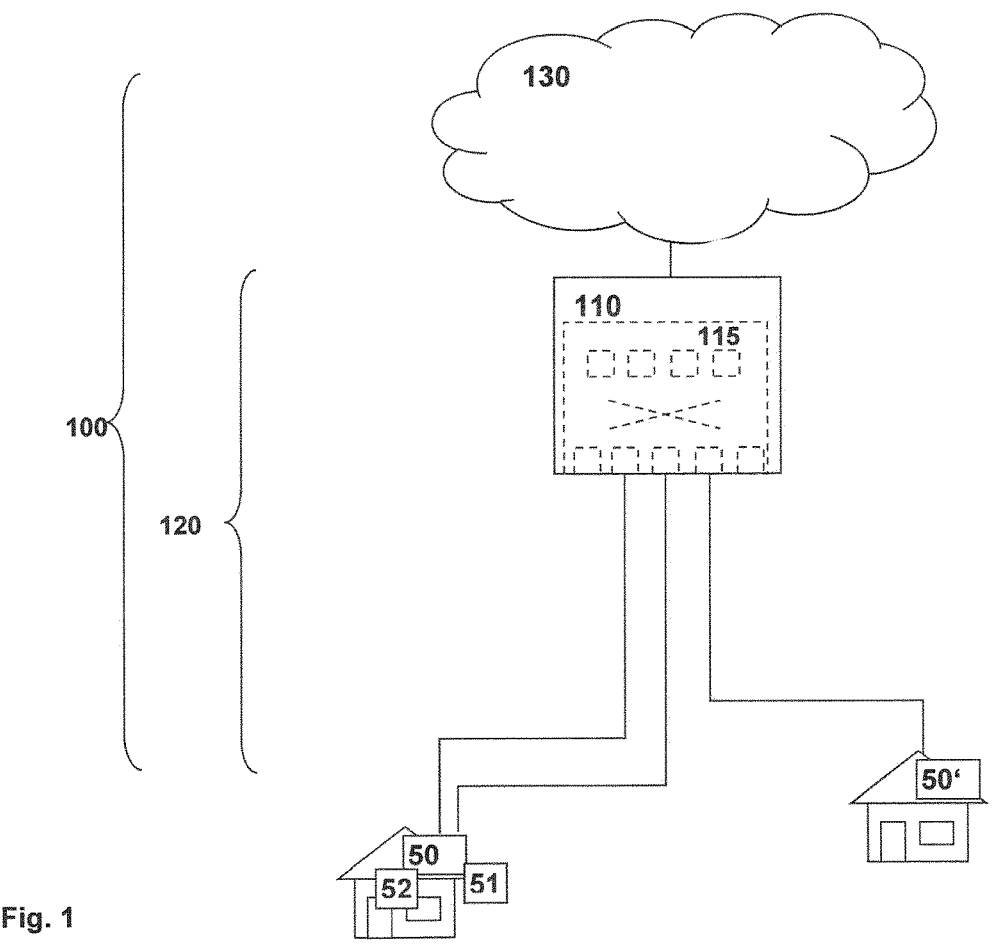
FIG. 1 schematically illustrates a telecommunications network according to the present invention, having a broadband access network with a central office point of delivery.

Exemplary embodiments of the present invention provide a technically simple and effective solution for an improved and simplified operation and architecture of a central office point of delivery and/or for flexibly providing, within the central office point of delivery, user-related traffic to at least one central functional entity providing at least one specific functionality. Further exemplary embodiments of the present invention provide a corresponding telecommunications network and a corresponding system.

In an exemplary embodiment, the present invention provides a method for an improved and simplified operation and architecture of a central office point of delivery within a broadband access network of a telecommunications network and/or for flexibly providing, within the central office point of delivery, user-related traffic to at least one central functional entity providing at least one specific functionality, wherein the central office point of delivery and/or the broadband access network comprises a control node or a control plane, at least one repository node and a plurality of line termination nodes, wherein a specific line termination node of the plurality of line termination nodes is connected—using an access node port of the specific line termination node—to at least one specific network termination node of a plurality of network termination nodes, wherein the broadband access network or the central office point of delivery comprises both a plurality of service edge nodes and the at least one central functional entity providing the at least one specific functionality within the central office point of delivery or for the central office point of delivery, wherein user-related traffic—related to the specific line termination node and, hence, to a related specific service edge node of the plurality of service edge nodes—is routed, within or traversing the central office point of delivery, to the at least one central functional entity, wherein the method, especially for flexibly providing user-related traffic, comprises the following steps:

in a first step, the user-related traffic is routed to the specific service edge node selected or determined, by the repository node, based on or dependent on the specific network termination node and/or the specific line termination node, in a second step, especially subsequent to the first step, the user-related traffic is provided to the at least one central functional entity providing the at least one specific functionality within the central office point of delivery or for the central office point of delivery.

In an exemplary embodiment, the present invention provides a method for an improved and simplified operation and architecture of a central office point of delivery within a broadband access network of a telecommunications network and/or for flexibly providing, within the central office point of delivery, user-related traffic to at least one central functional entity providing at least one specific functionality, wherein the central office point of delivery and/or the broadband access network comprises a control node or a control plane, at least one repository node and a plurality of line termination nodes, wherein a specific line termination node of the plurality of line termination nodes is connected—using an access node port of the specific line termination node—to at least one specific network termination node of a plurality of network termination nodes, wherein the broadband access network or the central office point of delivery comprises both a plurality of service edge nodes and the at least one central functional entity providing the at least one specific functionality within the central office point of delivery or for the central office point of delivery, wherein user-related traffic—related to the specific line termination node and, hence, to a related specific service edge node of the plurality of service edge nodes—is routed, within or traversing the central office point of delivery, to the at least one central functional entity, wherein the method comprises the following steps:

in a first step, the user-related traffic is routed to the specific service edge node selected or determined, by the repository node, based on or dependent on the specific network termination node and/or the specific line termination node, in a second step, the user-related traffic is provided to the at least one central functional entity providing the at least one specific functionality within the central office point of delivery or for the central office point of delivery, wherein the at least one central functional entity corresponding to a network node providing at least one specific functionality being centrally handled within the central office point of delivery is at least one of the following:
- a node providing accounting information and/or processing accounting information,
- a node providing performance monitoring,
- a node providing a legal interception functionality.

It is thereby advantageously possible according to the present invention to reduce the complexity of the conventionally used architecture of a service edge node within a central office point of delivery implementation. Additionally, it is advantageously possible according to the present invention to also reduce the complexity of the at least one central functional entity providing at least one specific functionality, i.e. the special task service edge components. Together, this provides benefits with respect to the development agility of the components of such a central office point of delivery implementation.

Furthermore, according to the present invention, it is advantageously possible to reduce the number of network routes towards other parts of the telecommunications network, especially to the backbone of the telecommunications network. This is possible according to the present invention because per task, i.e. per specific functionality (provided by the central functional entity), only a single (or, in any case, fewer) IP instances (per central office point of delivery) are needed.

In conventionally known telecommunications networks, so-called SDN-based (software defined network-based) access networks or network architectures, especially regarding the central office functionalities, typically decompose or differentiate a data plane from a control plane. This is typically done on a leaf-spine architecture such that compute nodes providing functionalities such as access nodes, or network I/O, are connected to leaf switches. The broadband network gateway functions (BNG functions), access node control and management components are typically implemented as virtual network functions (VNFs), such as virtual broadband network gateways (vBNG), or virtual access node (vAN), respectively, and typically implemented (or executed) on compute nodes such as x86 servers.

According to such a conventionally known architecture, a broadband network gateway service instance typically encompasses multiple tasks, mimicking the functionality of a legacy broadband network gateway. Depending on the specific instance, deployment scenario, product portfolio and location, such tasks comprise a combination of common service edge tasks, such as, e.g., point-to-point-protocol (PPP) termination, authentication and authorization of the subscriber, as well as more specific tasks or functionalities, such as, e.g., layer 2 tunnel protocol encapsulation/decapsulation, especially for wholesale/wholebuy subscribers, VPN tunnel encapsulation/decapsulation, traffic accounting, performance monitoring, and legal intercept.

According to the present invention, a separation of the above mentioned tasks is provided (or a decomposition on a functional level), i.e. the common service edge tasks remain in the service edge node, and for the specific tasks or functionalities, at least one dedicated service node (or at least one central functional entity providing at least one specific functionality) but in practice typically a plurality of dedicated service nodes (or a plurality of central functional entity providing the specific functionalities) is/are deployed for the specific functionality or specific functionalities. According to the present invention, this allows to leverage the network processing feature set of the leaf-spine fabric to implement simple tasks (such as fabric switching, adding and removing tunnel headers, point-to-point-protocol processing) needed for common service edge functions, while adding the special features or functionalities only to a dedicated head-end (or central functional entity, providing at least one specific functionality in or for the central office point of delivery). This dedicated head-end or central functional entity may either be realized via a virtual function on general hardware (such as x86 hardware), a hardware assisted function, or a special network node programmed for the respective task. Such a dedicated head-end or central functional entity is able to be activated and the paths towards the head-end can, e.g., be programmed by the switching fabric controller, based on customer profiles and subscriber services. In the same manner, traffic duplication and/or forwarding to services nodes is able to be realized.

Hence, according to the present invention, it is advantageously possible that wherein user-related traffic—related to a specific line termination node (especially related to the specific line termination node and the specific network termination node) and, hence, to a related specific service edge node—is routed, within or traversing the central office point of delivery, to the at least one central functional entity, wherein, especially for flexibly providing user-related traffic, the method comprises first and second steps, wherein in the first step, the user-related traffic is routed to the specific service edge node selected or determined, by the repository node, based on or dependent on the specific network termination node and/or the specific line termination node, and wherein in the second step, especially subsequent to the first step, the user-related traffic is provided to the at least one central functional entity providing the at least one specific functionality within the central office point of delivery or for the central office point of delivery.

The telecommunications network according to the present invention may be a fixed-line telecommunications network or a mobile communication network but preferably is a telecommunications network having both aspects (or parts) of a fixed-line telecommunications network (or being a fixed-line telecommunications network in such parts) and aspects (or parts) of a mobile communication network (or being a mobile communication network in such parts); such networks are also known under the term fixed-mobile-convergence networks (FMC networks).

According to a further embodiment of the present invention, within the central office point of delivery and via the control node or the control plane, the user-related traffic is provided to the at least one central functional entity via traffic steering the user-related traffic to the at least one central functional entity and/or via duplicating the user-related traffic and to provide the duplicated user-related traffic to the at least one central functional entity.

Thereby, it is advantageously possible to comparatively easily provide the user-related traffic to the appropriate central functional entity.

Furthermore, it is advantageously possible according to the present invention that the broadband access network comprises a switching fabric within the central office point of delivery, the switching fabric especially comprising a plurality of spine network nodes and a plurality of leaf network nodes, wherein providing the user-related traffic to the at least one central functional entity involves using the switching fabric for traffic steering the user-related traffic and/or for duplicating the user-related traffic and/or for providing the user-related traffic to the at least one central functional entity.

Via using a switching fabric comprising spine network nodes and leaf network nodes, it is efficiently possible to provide the user-related traffic to the appropriate central functional entity.

Furthermore, it is advantageously possible according to the present invention that the at least one central functional entity corresponds to a tunnel setup node, wherein the user-related traffic—after having been routed to the specific service edge node—is directed or steered towards the tunnel setup node, wherein the user-related traffic comprises a user-related identifier information, especially related to the identity information of the specific network termination node and/or related to the access node port.

It is thereby advantageously possible to provide a centralized tunnel setup functionality within the central office point of delivery or for the central office point of delivery.

Furthermore, the at least one central functional entity corresponding to a tunnel setup node may be at least one of the following:
- a bit stream access node, especially a layer 3 bit stream access node and especially acting as a tunnel protocol access concentrator towards a network node of a further telecommunications network in a wholesale scenario,
- a virtual private network termination node,
- a generic tunnel setup node.

In a further exemplary embodiment, a plurality of central functional entities correspond to a tunnel setup node, i.e. there is a plurality of tunnel setup nodes, e.g. one corresponding to a bit stream access node, one corresponding to a virtual private network termination node, and/or one corresponding to a generic tunnel setup node.

According to a further embodiment of the present invention, the at least one central functional entity corresponds to a network node providing at least one specific functionality being centrally handled within the central office point of delivery, wherein the user-related traffic—after having been routed to the specific service edge node—is duplicated and provided to the central functional entity based on a user-related identifier information, especially related to the identity information of the specific network termination node and/or related to the access node port.

It is thereby advantageously possible to easily and effectively realize an embodiment of the inventive method of an improved and simplified operation and architecture of a central office point of delivery, and to provide a centralized functional entity, centrally performing at least one specific functionality within the central office point of delivery or for the central office point of delivery.

According to a further embodiment of the present invention, the at least one central functional entity corresponding to a network node providing at least one specific functionality being centrally handled within the central office point of delivery is at least one of the following:
- a node providing accounting information and/or processing accounting information,
- a node providing performance monitoring,
- a node providing a legal interception functionality.

Via centrally handling the generation and/or processing of accounting information, and/or the provision of performance monitoring, and/or the provision of a legal interception functionality it is advantageously possible to realize an embodiment of the inventive method of an improved and simplified operation and architecture of a central office point of delivery.

Furthermore, the present invention relates to a telecommunications network for an improved and simplified operation and architecture of a central office point of delivery within a broadband access network of a telecommunications network and/or for flexibly providing, within the central office point of delivery, user-related traffic to at least one central functional entity providing at least one specific functionality, wherein the central office point of delivery and/or the broadband access network comprises a control node or a control plane, at least one repository node and a plurality of line termination nodes, wherein a specific line termination node of the plurality of line termination nodes is connected—using an access node port of the specific line termination node—to at least one specific network termination node of a plurality of network termination nodes, wherein the broadband access network or the central office point of delivery comprises both a plurality of service edge nodes and the at least one central functional entity providing the at least one specific functionality within the central office point of delivery or for the central office point of delivery, wherein user-related traffic—related to the specific line termination node and, hence, to a related specific service edge node of the plurality of service edge nodes—is routed, within or traversing the central office point of delivery, to the at least one central functional entity, wherein the telecommunications network is configured such that:

the user-related traffic is routed to the specific service edge node selected or determined, by the repository node, based on or dependent on the specific network termination node and/or the specific line termination node, the user-related traffic is provided to the at least one central functional entity providing the at least one specific functionality within the central office point of delivery or for the central office point of delivery.

Furthermore, the present invention also relates to a telecommunications network for an improved and simplified operation and architecture of a central office point of delivery within a broadband access network of a telecommunications network and/or for flexibly providing, within the central office point of delivery, user-related traffic to at least one central functional entity providing at least one specific functionality, wherein the central office point of delivery and/or the broadband access network comprises a control node or a control plane, at least one repository node and a plurality of line termination nodes, wherein a specific line termination node of the plurality of line termination nodes is connected—using an access node port of the specific line termination node—to at least one specific network termination node of a plurality of network termination nodes, wherein the broadband access network or the central office point of delivery comprises both a plurality of service edge nodes and the at least one central functional entity providing the at least one specific functionality within the central office point of delivery or for the central office point of delivery, wherein user-related traffic—related to the specific line termination node and, hence, to a related specific service edge node of the plurality of service edge nodes—is routed, within or traversing the central office point of delivery, to the at least one central functional entity, wherein the telecommunications network is configured such that:

the user-related traffic is routed to the specific service edge node selected or determined, by the repository node, based on or dependent on the specific network termination node and/or the specific line termination node, the user-related traffic is provided to the at least one central functional entity providing the at least one specific functionality within the central office point of delivery or for the central office point of delivery wherein the at least one central functional entity corresponding to a network node providing at least one specific functionality being centrally handled within the central office point of delivery is at least one of the following:

a node providing accounting information and/or processing accounting information, a node providing performance monitoring, a node providing a legal interception functionality.

Furthermore, the present invention relates to a system for an improved and simplified operation and architecture of a central office point of delivery within a broadband access network of a telecommunications network and/or for flexibly providing, within the central office point of delivery, user-related traffic to at least one central functional entity providing at least one specific functionality, the system comprising the telecommunications network and the central office point of delivery, wherein the central office point of delivery and/or the broadband access network comprises a control node or a control plane, at least one repository node and a plurality of line termination nodes, wherein a specific line termination node of the plurality of line termination nodes is connected—using an access node port of the specific line termination node—to at least one specific network termination node of a plurality of network termination nodes, wherein the broadband access network or the central office point of delivery comprises both a plurality of service edge nodes and the at least one central functional entity providing the at least one specific functionality within the central office point of delivery or for the central office point of delivery, wherein user-related traffic—related to the specific line termination node and, hence, to a related specific service edge node of the plurality of service edge nodes—is routed, within or traversing the central office point of delivery, to the at least one central functional entity, wherein the system is configured such that:

the user-related traffic is routed to the specific service edge node selected or determined, by the repository node, based on or dependent on the specific network termination node and/or the specific line termination node, the user-related traffic is provided to the at least one central functional entity providing the at least one specific functionality within the central office point of delivery or for the central office point of delivery.

Furthermore, the present invention also relates to a system for an improved and simplified operation and architecture of a central office point of delivery within a broadband access network of a telecommunications network and/or for flexibly providing, within the central office point of delivery, user-related traffic to at least one central functional entity providing at least one specific functionality, the system comprising the telecommunications network and the central office point of delivery, wherein the central office point of delivery and/or the broadband access network comprises a control node or a control plane, at least one repository node and a plurality of line termination nodes, wherein a specific line termination node of the plurality of line termination nodes is connected—using an access node port of the specific line termination node—to at least one specific network termination node of a plurality of network termination nodes, wherein the broadband access network or the central office point of delivery comprises both a plurality of service edge nodes and the at least one central functional entity providing the at least one specific functionality within the central office point of delivery or for the central office point of delivery, wherein user-related traffic—related to the specific line termination node and, hence, to a related specific service edge node of the plurality of service edge nodes—is routed, within or traversing the central office point of delivery, to the at least one central functional entity, wherein the system is configured such that:

the user-related traffic is routed to the specific service edge node selected or determined, by the repository node, based on or dependent on the specific network termination node and/or the specific line termination node, the user-related traffic is provided to the at least one central functional entity providing the at least one specific functionality within the central office point of delivery or for the central office point of delivery wherein the at least one central functional entity corresponding to a network node providing at least one specific functionality being centrally handled within the central office point of delivery is at least one of the following:

a node providing accounting information and/or processing accounting information, a node providing performance monitoring, a node providing a legal interception functionality.

Still additionally, the present invention relates to a program comprising a computer readable program code which, when executed on a computer and/or on a central office point of delivery, causes the computer and/or the central office point of delivery to perform an embodiment of the inventive method.

Furthermore, the present invention relates to a computer-readable medium for an improved and simplified operation and architecture of a central office point of delivery within a broadband access network of a telecommunications network and/or for flexibly providing, within the central office point of delivery, user-related traffic to at least one central functional entity providing at least one specific functionality, the computer-readable medium comprising instructions which when executed on a computer or on a central office point of delivery, causes the computer and/or the central office point of delivery to perform an embodiment of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order; this is especially the case for the terms "first step", "second step", etc. It is to be understood that the terms so used are interchangeable under appropriate circumstances and that the embodiments of the invention described herein are capable of operation in other sequences than described or illustrated herein.

In FIG. 1, a telecommunications network 100 according to the present invention is schematically shown, having—preferably—at least a fixed line part. A mobile (or cellular) part may be present as well, as part of the telecommunications network 100. User equipment or client devices 51, 52 are connected to the telecommunications network 100 via a (broadband) access network 120. The telecommunications network 100 comprises, especially as part of the broadband access network 120, at least one logical or physical central office point of delivery 110 that is preferably realized within a data center and that is especially handling different access requirements, especially different access possibilities, of the client devices 51, 52 to network functionalities provided by the telecommunications network 100 or via the telecommunications network 100. The client devices 51, 52 are typically connected to the logical or physical central office point of delivery 110 via a customer premises equipment device 50, 50' or via a customer premises equipment functionality that may be built in the client devices 51, 52. Preferably but not necessarily, the central office point of delivery 110 comprises a switching fabric 115 comprising a plurality of spine network nodes and typically also a plurality of leaf network nodes.

Figure 2:
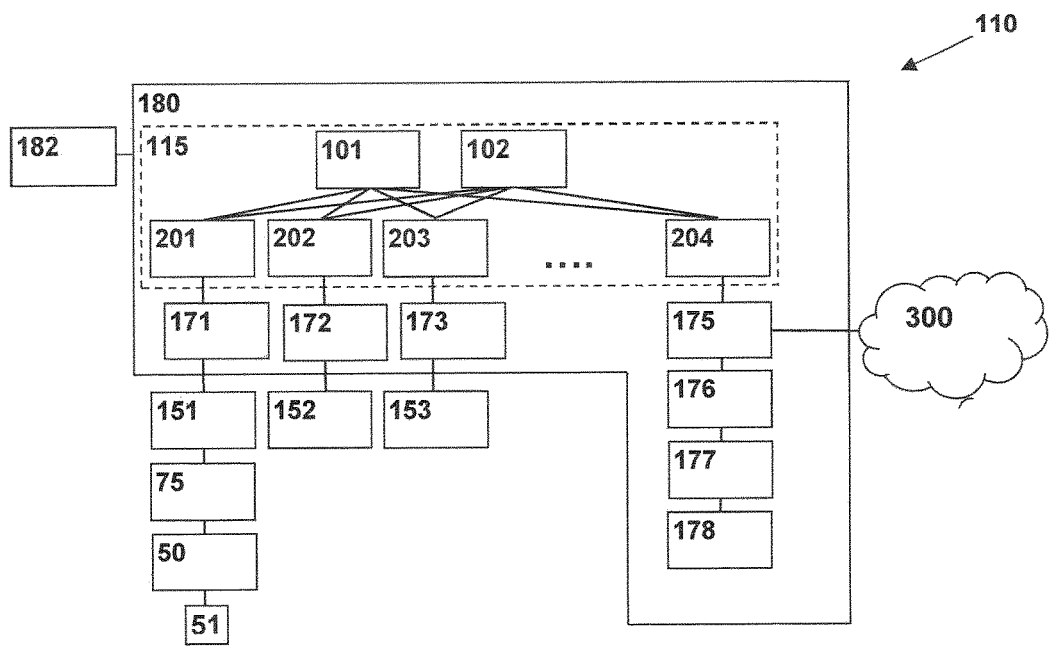
FIG. 2 schematically illustrates a part of a broadband access network of a telecommunications network in an exemplary embodiment with a central office point of delivery and a plurality of service edge nodes, as well as a plurality of central functional entities providing, respectively, at least one specific functionality.

FIG. 2 schematically illustrates a central office point of delivery 110 as part of a broadband access network 120 of a telecommunications network 100, wherein the represented part of the telecommunications network 100 comprises—besides a control node 180 and at least one repository node 182—a plurality of line termination nodes 151, 152, 153. Typically, each of the line termination nodes 151, 152, 153 has one or a plurality of access node ports. In the example represented in FIG. 2, the broadband access network 120 comprises three line termination nodes, a first line termination node 151, a second line termination node 152, and a third line termination node 153. The line termination nodes 151, 152, 153 may be provided to support different access technologies to a home gateway or customer premises equipment 50. In the exemplary embodiment shown in FIG. 2, the first line termination node 151 is taken as a line termination node supporting to be connected to an optical network, especially a passive optical network (PON), typically a so-called optical line terminal (OLT) or optical line terminal device. In such a situation, a client device 51 is connected to the telecommunications network 100 (i.e. to the first (or also called specific) line termination node 151) via the customer premises equipment 50 (or home gateway device 50) and a network termination node 75. The functionality of the customer premises equipment 50 (or home gateway device 50) and the functionality of the network termination node 75 may also be integrated in one device or "box". Even the functionality of the client device 51, the functionality of the customer premises equipment 50 (or home gateway device 50) and the functionality of the network termination node 75 may be integrated in one device or "box". Nevertheless, these functionalities are represented in FIG. 2 as separated functionalities. In FIG. 2, only one home gateway device 50 (or customer premises equipment 50) (i.e. a specific customer premises equipment), and only one client device 51, and only one network termination node 75 (i.e. a specific network termination node) are shown. However, also the second and/or third line termination nodes 152, 153 may be connected to corresponding network termination nodes and customer premises equipments.

In the context of the present invention, in order to separate the "specific" or considered entities from the other entities of the same kind within the broadband access network 120, the first line termination node 151 is also called the specific line termination node 151, the network termination node 75 connected to the first line termination node 151 is also called the specific network termination node 75, and the customer premises equipment 50 connected to the specific network termination node 75 is also called the specific customer premises equipment.

In case of the line termination nodes 151, 152, 153 having a plurality of access node ports, also a plurality of network termination nodes are able to be connected to one line termination node 151, 152, 153 and/or (in case that a network termination node has a plurality of ports) also a plurality of customer premises equipments are able to be connected to one network termination node.

According to the present invention, a method for an improved and simplified operation of a central office point of delivery 110 within a broadband access network 120 of a telecommunications network 100 as well as a corresponding architecture of a central office point of delivery 110 is provided. Especially, this serves to flexibly provide, within the central office point of delivery, user-related traffic to at least one central functional entity providing at least one specific functionality.

The central office point of delivery 110 and/or the broadband access network 120 comprises a control node 180, at least one repository node 182, a plurality of line termination nodes 151, 152, 153, wherein a specific line termination node 151 of the plurality of line termination nodes is connected—using an access node port of the specific line termination node 151—to typically only one specific network termination node 75 (of a plurality of network termination nodes). Furthermore, the broadband access network 120 or the central office point of delivery 110 comprises both a plurality of service edge nodes 171, 172, 173, and the at least one central functional entity 175, 176, 177, 178 providing the at least one specific functionality within the central office point of delivery 110 or for the central office point of delivery 110.

According to the present invention, user-related traffic—related to the specific line termination node 151 and, hence, to a related specific service edge node 171 of the plurality of service edge nodes 171, 172, 173—is routed, within or traversing the central office point of delivery 110, to the at least one central functional entity 175, 176, 177, 178, wherein the method, especially for flexibly providing user-related traffic, comprises the following steps:

in a first step, the user-related traffic is routed to the specific service edge node 171 selected or determined, by the repository node 182, based on or dependent on the specific network termination node 75 and/or the specific line termination node 151, in a second step, especially subsequent to the first step, the user-related traffic is provided to the at least one central functional entity 175, 176, 177, 178 providing the at least one specific functionality within the central office point of delivery 110 or for the central office point of delivery 110.

According to the present invention, at least one central functional entity 175, 176, 177, 178 is utilized (in order to provide (the) at least one specific functionality within the central office point of delivery 110 or for the central office point of delivery 110); or a plurality of central functional entities 175, 176, 177, 178 may be deployed within the central office point of delivery 110 (or for the central office point of delivery 110), each one of these central functional entities 175, 176, 177, 178 providing, respectively at least one specific functionality. In the example shown in FIG. 2, four different central functional entities 175, 176, 177, 178 are exemplarily represented, a first central functional entity 175 being (or corresponding to) a tunnel setup node 175 (and being linked to a network node or a (further) telecommunications network 300 (typically of another network operator) in a wholesale scenario), a second central functional entity 176, a third central functional entity 177, and a fourth central functional entity 178 being (or corresponding to), respectively, a network node providing at least one specific functionality being centrally handled within the central office point of delivery 110, wherein the second central functional entity 176 especially is or corresponds to a node providing accounting information and/or processing accounting information 176, the third central functional entity 177 especially is or corresponds to a node providing performance monitoring 177, and the fourth central functional entity (178) especially is or corresponds to a node providing a legal interception functionality 178.

Typically, a functionality provided by the central functional entities 175, 176, 177, 178 is specific to the respective corresponding central functional entity 175, 176, 177, 178; however, the architecture of the central office point of delivery 110 may also be provided such that one central functional entity 175, 176, 177, 178 (centrally, regarding the central office point of delivery 100) provides more than one specific functionality. One example thereof may be the first central functional entity 175 (being or corresponding to a tunnel setup node 175, wherein the tunnel setup node 175 not only provides a bit stream access node (especially a layer 3 bit stream access node and especially acting as a tunnel protocol access concentrator towards a network node of a further telecommunications network in a wholesale scenario) but also (typically regarding another customer or user of the central office point of delivery 110) as a virtual private network termination node and/or as a generic tunnel setup node.

In an exemplary embodiment, the method involves user-related traffic—related to the specific line termination node 151 and, hence, to a related specific service edge node 171 of the plurality of service edge nodes 171, 172, 173—being routed, within or traversing the central office point of delivery 110, to a plurality of central functional entities 175, 176, 177, 178, wherein the method comprises the following steps:
- in a first step, the user-related traffic is routed to the specific service edge node 171 selected or determined, by the repository node 182, based on or dependent on the specific network termination node 75 and/or the specific line termination node 151,
- in a second step, the user-related traffic is provided, simultaneously or sequentially or in part simultaneously and in part sequentially, to the plurality of central functional entities 175, 176, 177, 178 providing the respective specific functionalities within the central office point of delivery 110 or for the central office point of delivery 110.

Hence, FIG. 2 schematically shows a setup of a central office point of delivery 110 according to the present invention. The specific customer premises equipment 50 (or specific home gateway 50) is connected via the specific optical network terminal (or the specific network termination node 75) and the specific optical line terminal (OLT MAC) (or the specific line termination node 151) to a leaf switch 201 (of a plurality of leaf switches 201, 202, 203) which is dual-homed at a plurality of spine switches 101, 102. In the exemplary embodiment shown in FIG. 2, it is assumed that the plurality of service edge nodes 171, 172, 173 are separated from the spine switches 101, 102; however, in an alternative embodiment according to the present invention, spine switches 101, 102 also have a functionality of a service edge (node) 171, 172, 173 or a service edge user plane function or functionality. Especially, the control or control node 180 for the access domain—which controls the central office point of delivery 110—has an access domain repository or repository node 182 (so-called A4 repository) which holds all devices, especially all devices within the passive optical network, including the connected optical network terminal devices (network termination nodes) and/or home gateways 50.

Figure 3:
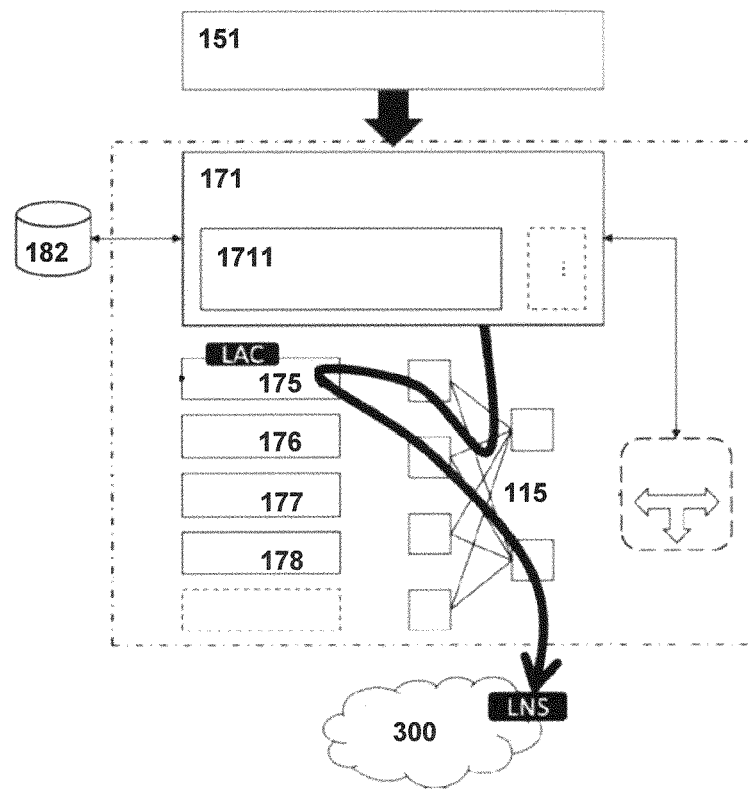
FIG. 3 schematically illustrates a first example of a method according to the present invention for an improved and simplified operation and architecture of a central office point of delivery and/or for flexibly providing user-related traffic to a central functional entity corresponding to a tunnel setup node.

In FIG. 3, a first example of a method according to the present invention for an improved and simplified operation and architecture of a central office point of delivery 110 and/or for flexibly providing user-related traffic to a central functional entity corresponding to a tunnel setup node 175 is schematically shown.

Figure 4:
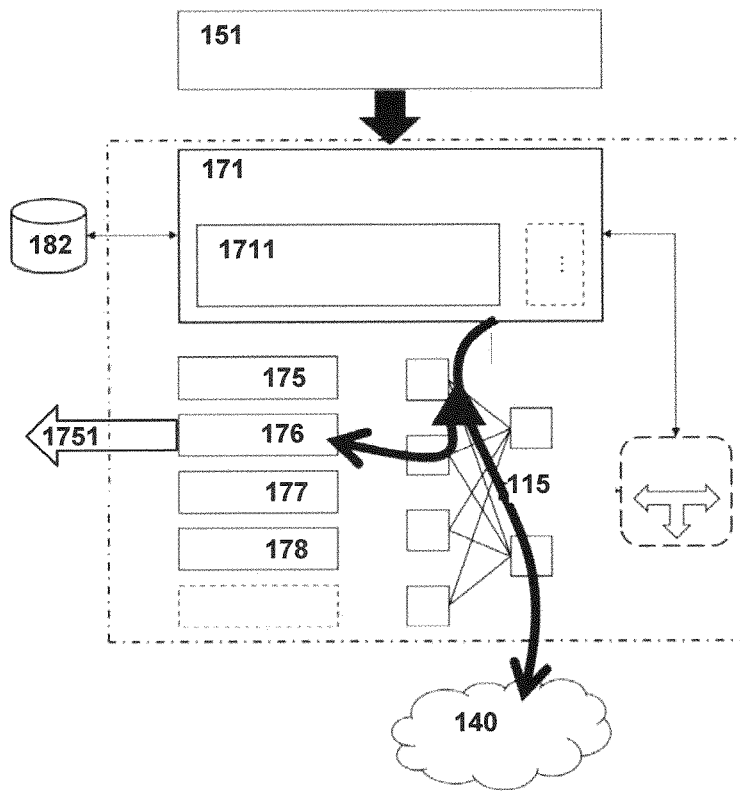
FIG. 4 schematically illustrates a second example of a method according to the present invention for an improved and simplified operation and architecture of a central office point of delivery and/or for flexibly providing user-related traffic to a central functional entity corresponding to a network node providing at least one specific functionality being centrally handled within the central office point of delivery.

In FIG. 4, a second example of a method according to the present invention for an improved and simplified operation and architecture of a central office point of delivery 110 and/or for flexibly providing user-related traffic to a central functional entity 176, 177, 178 corresponding to a network node providing at least one specific functionality being centrally handled within the central office point of delivery 110.

In both FIGS. 3 and 4, the specific service edge node 171 (corresponding to the specific line termination node 151 or access node, such as OLT, MSAN (multi-service access node) or the like) of a user of the central office point of delivery 110 is schematically shown. Common service edge tasks are indicated via reference sign 1711; the database is indicated via reference sign 182. The switching fabric is indicated via reference sign 115, and the first, second, third, and fourth central functional entities 175, 176, 177, 178 are schematically shown.

In FIG. 3, the specific case of the central functional entity being a tunnel setup node 175 is shown. From the specific service edge node 171, the user-related traffic is steered, by the switching fabric 115, towards the tunnel setup node 175 (i.e. the first central functional entity 175). The tunnel setup node 175 acts as one side of a network tunnel towards a further telecommunications network 300 or part thereof. In case that the tunnel setup node 175 is used to provide wholesale access, the first central functional entity 175 corresponds to a bit stream access node, especially a layer 3 bit stream access node and especially acting as a tunnel protocol access concentrator towards the further telecommunications network 300. Typically, network operators own the last mile to the customer, and are often required to open their access infrastructure for other network operators that want to provide their services to a broader subscriber base. The operator owning the last mile uses the term "wholesale" to describe such operator to operator relationships, while the operator "renting" the last mile uses the term "wholebuy". A common method to implement wholesale/wholebuy on a technical level is the L2TP (layer 2 tunneling protocol) which offers an IP-agnostic bit stream access (BSA). L2TP is a tunneling protocol which is terminated by the L2TP access concentrator (LAC) on the wholesaler side and the L2TP Network Server (LNS) on the wholebuyer side. In order to more efficiently provide such a wholesale possibility, the present invention separates the LAC/LNS in CORD like deployments into a dedicated node. It not only allows to keep the retail subscriber service edge node simpler, but also offers the possibility to reduce the number of L2TP termination nodes in the wholesaler network. Hence, only one LAC instance is needed per central office point of delivery 110 instead of one on every service edge node 171, 172, 173, which also reduces the number of instantiated tunnel connections. In addition, the different functionalities (retail service edge node and L3BSA nodes) can evolve on their own and do not create dependencies and, thus, reduce complexity, hence allowing faster development cycles. As it is shown in FIG. 3, the subscriber sessions—typically point-to-point-protocol connections or point-to-point-protocol over ethernet connections—originating at the wholebuyer customers' customer premises equipments enter the access network via their ONT (optical network terminal) or DPU, traverse through the passive optical network to the optical line terminal (OLT) or line termination node 151, and are eventually received by the common service edge (i.e. specific service edge node 171). The specific service edge node 171 queries its policy server (e.g. Radius) and establishes the context that this subscriber (or user) is a wholesale subscriber. Accordingly, its traffic is directed towards the dedicated L3BSA node (or tunnel setup node 175) along with the access node port tag (i.e. a user-related identifier information, especially related to the identity information of the specific network termination node 75 and/or related to the access node port), which in turn sets up the L2TP tunnel towards the LNS.

According to the present invention, a dedicated LNS node is able to collect incoming non-retail subscribers, terminate the L2TP tunnel and forward the traffic to a common service edge node for service creation.

Furthermore, a similar scenario enabled via the present invention is to extend this concept to generic tunnel setup and/or VPN (virtual private network) termination tasks.

In FIG. 4, the specific case of the central functional entity corresponds to a network node providing at least one specific functionality being centrally handled within the central office point of delivery 110 is shown for the example of the central functional entity being a node providing accounting information and/or processing accounting information 176. The user-related traffic is provided to the backbone 140 of the telecommunications network 100 as well as to the second central functional entity 176. Typically, a network operator needs to count (for accounting purposes) the traffic consumed by a subscriber. Both classical per volume unit accounting as well as contemporary high-speed volume bucket schemes require this. In addition, even more advanced schemes where special services (e.g. streaming services, IPTV, VoIP, etc.) are exempt from consuming volume are becoming more and more popular. When needing to count all these different services per subscriber in a service edge implemented on a leaf switch, the total available number of counters quickly becomes a bottleneck. According to the present invention, the dedicated node providing accounting information and/or processing accounting information 176 is introduced for counting special traffic. The accounting relevant traffic is mirrored towards the accounting node 176. This mirroring could be done on any of the components of the fabric 115 (i.e. leaf or spine). The accounting node 176 will then generate the accounting records from the observed traffic.

A corresponding realization is possible for the example that the central functional entity being a node providing performance monitoring 177, especially for specific services. The operator of the telecommunications network 100 may want to monitor the performance of its IPTV multicast system; according to the present invention, this is done by deploying probes in the network which are fed by mirror ports on a broadband network gateway, hence providing the node providing performance monitoring 177 with the user-related traffic for monitoring purposes.

A further corresponding realization is possible for the example that the central functional entity being a node providing a legal interception functionality 178. Here, a specific subset of traffic needs to be copied and encrypted into an IPSec tunnel (or another encrypted tunnel protocol) and transmitted to the authorities. In this case, both duplication and steering of the user-related traffic is required. A specific benefit is that only one instance is needed per central office point of delivery 110 instead of a number of IPSec tunnels corresponding to the number of service edge nodes 171, 172, 173.

Hence, according to the present invention, new nodal types (central functional entities 175, 176, 177, 178) and a new manner of decomposing resource consuming functions to dedicated hardware nodes are provided. Each of the central functional entities 175, 176, 177, 178 has a dedicated task and removes the burden from a common service edge node 171, 172, 173 to implementing a specific feature set. This provides the benefit to design the service nodes according to the service specific needs with the added benefit that those may only need to be installed once in a central office point of delivery 110. The use of software defined network-based control provides flexible and dynamic switching of the traffic towards these dedicated service nodes.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operation of a central office point of delivery within a broadband access network of a telecommunications network and/or for flexibly providing, within the central office point of delivery, user-related traffic to at least one central functional entity providing at least one specific functionality within the central office point of delivery or for the central office point of delivery,
wherein the central office point of delivery and/or the broadband access network comprises a control node or a control plane, at least one repository node and a plurality of line termination nodes, wherein a specific line termination node of the plurality of line termination nodes is connected—via an access node port of the specific line termination node—to at least one specific network termination node of a plurality of network termination nodes,
wherein the central office point of delivery comprises a plurality of service edge nodes and a network node corresponding to the at least one central functional entity,
wherein the broadband access network comprises a switching fabric within the central office point of delivery, the switching fabric comprising a plurality of spine network nodes and a plurality of leaf network nodes,
wherein the method comprises:
performing, by the central office point of delivery, service decomposition on a plurality of tasks, wherein the plurality of tasks include common service edge tasks and specific tasks or functionalities, and wherein performing service decomposition on the plurality of tasks comprises:
in a first step, user-related traffic is routed to a specific service edge node of the plurality of service edge nodes,
wherein the user-related traffic is related to the specific line termination node and to the specific service edge node,
wherein the specific service edge node is connected to a first leaf network node of the plurality of leaf network nodes,
wherein the specific service edge node is selected or determined by the at least one repository node based on the at least one specific network termination node and/or the specific line termination node, and
wherein the specific service edge node performs the common service edge tasks; and
in a second step, the user-related traffic is duplicated and provided to the network node of the central office point of delivery via the switching fabric within the central office point of delivery, wherein the network node is connected to a second leaf network node of the plurality of leaf network nodes, and wherein the network node performs the specific tasks or functionalities;
wherein the common service edge tasks performed by the specific service edge node comprise: point-to-point-protocol (PPP) processing or termination, authentication and authorization of a subscriber, fabric switching, and/or adding and removing tunnel headers; and
wherein the specific tasks or functionalities performed by the network node corresponding to the at least one central functional entity comprise: providing accounting information; processing accounting information; providing performance monitoring; and/or providing a legal interception functionality.

2. The method according to claim 1, wherein the at least one central functional entity corresponds to a tunnel setup node, wherein the user-related traffic—after having been routed to the specific service edge node—is directed or steered towards the tunnel setup node, wherein the user-related traffic comprises user-related identifier information related to identity information of the at least one specific network termination node and/or related to the access node port.

3. The method according to claim 1, wherein the at least one central functional entity corresponds to a tunnel setup node, wherein the tunnel setup node is at least one of the following:
a layer 3 bit stream access node acting as a tunnel protocol access concentrator towards a network node of a further telecommunications network in a wholesale scenario,
a virtual private network termination node, or
a generic tunnel setup node.

4. The method according to claim 1, wherein the user-related traffic—after having been routed to the specific service edge node—is duplicated and provided to the at least one central functional entity based on user-related identifier information, related to identity information of the at least one specific network termination node and/or related to the access node port.

5. The method according to claim 1, wherein the user-related traffic received by the specific service edge node is subsequently provided to a backbone of the telecommunications network.

6. A telecommunications system, comprising:
a broadband access network comprising a central office point of delivery; and
at least one central functional entity providing at least one specific functionality within the central office point of delivery or for the central office point of delivery;
wherein the central office point of delivery and/or the broadband access network comprises a control node or a control plane, at least one repository node and a plurality of line termination nodes, wherein a specific line termination node of the plurality of line termination nodes is connected—via an access node port of the specific line termination node—to at least one specific network termination node of a plurality of network termination nodes;
wherein the central office point of delivery comprises a plurality of service edge nodes and a network node corresponding to the at least one central functional entity;
wherein the broadband access network comprises a switching fabric within the central office point of delivery, the switching fabric comprising a plurality of spine network nodes and a plurality of leaf network nodes;
wherein the central office point of delivery is configured to perform service decomposition on a plurality of tasks, wherein the plurality of tasks include common service edge tasks and specific tasks or functionalities, and wherein performing service decomposition on the plurality of tasks comprises:

in a first step, user-related traffic is routed to a specific service edge node of the plurality of service edge nodes,
 wherein the user-related traffic is related to the specific line termination node and to the specific service edge node,
 wherein the specific service edge node is connected to a first leaf network node of the plurality of leaf network nodes,
 wherein the specific service edge node is selected or determined by the at least one repository node based on the at least one specific network termination node and/or the specific line termination node, and
 wherein the specific service edge node performs the common service edge tasks; and
in a second step, the user-related traffic is duplicated and provided to the network node of the central office point of delivery via the switching fabric within the central office point of delivery,
 wherein the network node is connected to a second leaf network node of the plurality of leaf network nodes, and
 wherein the network node performs the specific tasks or functionalities;
wherein the common service edge tasks comprise: point-to-point-protocol (PPP) processing or termination, authentication and authorization of a subscriber, fabric switching, and/or adding and removing tunnel headers; and
wherein the specific tasks or functionalities corresponding to the at least one central functional entity comprise: providing accounting information;
processing accounting information; providing performance monitoring; and/or
providing a legal interception functionality.

7. A non-transitory computer-readable medium having processor-executable instructions stored thereon for operation of a central office point of delivery within a broadband access network of a telecommunications network and/or for flexibly providing, within the central office point of delivery, user-related traffic to at least one central functional entity providing at least one specific functionality within the central office point of delivery or for the central office point of delivery,
 wherein the central office point of delivery and/or the broadband access network comprises a control node or a control plane, at least one repository node and a plurality of line termination nodes, wherein a specific line termination node of the plurality of line termination nodes is connected—via an access node port of the specific line termination node—to at least one specific network termination node of a plurality of network termination nodes,
 wherein the central office point of delivery comprises a plurality of service edge nodes and a network node corresponding to the at least one central functional entity,
 wherein the broadband access network comprises a switching fabric within the central office point of delivery, the switching fabric comprising a plurality of spine network nodes and a plurality of leaf network nodes,
 wherein the processor-executable instructions, when executed, facilitate performance of the following:
performing, by the central office point of delivery, service decomposition on a plurality of tasks, wherein the plurality of tasks include common service edge tasks and specific tasks or functionalities, and wherein performing service decomposition on the plurality of tasks comprises:
 in a first step, user-related traffic is routed to a specific service edge node of the plurality of service edge nodes,
  wherein the user-related traffic is related to the specific line termination node and to the specific service edge node,
  wherein the specific service edge node is connected to a first leaf network node of the plurality of leaf network nodes,
  wherein the specific service edge node is selected or determined by the at least one repository node based on the at least one specific network termination node and/or the specific line termination node, and
  wherein the specific service edge node performs the common service edge tasks; and
 in a second step, the user-related traffic is duplicated and provided to the network node of the central office point of delivery via the switching fabric within the central office point of delivery,
  wherein the network node is connected to a second leaf network node of the plurality of leaf network nodes, and
  wherein the network node performs the specific tasks or functionalities;
wherein the common service edge tasks performed by the specific service edge node comprise: point-to-point-protocol (PPP) processing or termination, authentication and authorization of a subscriber, fabric switching, and/or adding and removing tunnel headers; and
wherein the specific tasks or functionalities performed by the network node corresponding to the at least one central functional entity comprise: providing accounting information; processing accounting information; providing performance monitoring; and/or providing a legal interception functionality.

* * * * *